United States Patent [19]

Hilaire et al.

[11] Patent Number: 5,434,492
[45] Date of Patent: Jul. 18, 1995

[54] SYSTEM FOR CONTROLLING A ONE ROLE SYNCHRONOUS MOTOR IN ACCORDANCE WITH A MEASURED BACK EMF

[75] Inventors: Jean-Francois Hilaire, Valence; Michel Guinet, Granges Les Valence, both of France

[73] Assignee: Crouzet Automatismes, Valence, France

[21] Appl. No.: 75,393

[22] Filed: Jun. 11, 1993

[30] Foreign Application Priority Data

Jun. 12, 1992 [FR] France ................... 92 07597

[51] Int. Cl.⁶ .............................................. H02P 7/00
[52] U.S. Cl. ...................................... 318/717; 318/721
[58] Field of Search ............................. 318/700–720, 318/727, 254, 439, 138, 721, 724, 696, 685

[56] References Cited

U.S. PATENT DOCUMENTS

| | | | |
|---|---|---|---|
| 4,229,682 | 10/1980 | Goddijn | 318/254 |
| 4,275,343 | 6/1981 | Fulton et al. | 318/721 |
| 4,480,218 | 10/1984 | Hair | 318/696 |
| 4,616,166 | 10/1986 | Cooper et al. | 318/712 |
| 4,928,049 | 5/1990 | Pietrobon et al. | |
| 5,084,662 | 1/1992 | Palaniappan et al. | 318/701 |
| 5,187,419 | 2/1993 | DeLange | 318/254 X |
| 5,235,264 | 8/1993 | Kaneda et al. | 318/138 X |
| 5,315,225 | 5/1994 | Heinrich et al. | 318/712 |

FOREIGN PATENT DOCUMENTS 0433219 11/1989 European Pat. Off. .
2600467 6/1986 France .

*Primary Examiner*—Jonathan Wysocki
*Attorney, Agent, or Firm*—Lowe, Price, LeBlanc & Becker

[57] ABSTRACT

A system controls a one-pole synchronous motor, with a magnetized rotor and a stator provided with two pairs of coils. The motor includes a floating common node to which are connected first coil terminals, the second terminal of each first coil of a coil pair is connected to a first supply terminal through a first respective switch, and the second terminal of each second coil of a coil pair is connected to a second supply terminal through a second respective switch. The control system includes a circuit operable for controlling switches in a stepping or self-switching mode, and at least one detection circuit using the voltage occurring at the floating common node so as to detect at least one operation condition of the motor.

8 Claims, 5 Drawing Sheets sens S sens −S

SYSTEM FOR CONTROLLING A ONE ROLE SYNCHRONOUS MOTOR IN ACCORDANCE WITH A MEASURED BACK EMF

BACKGROUND OF THE INVENTION

1. Field of the Invention

The present invention relates to synchronous motors, such as a stepping motor, and a sensor-free system for controlling such a motor. Such a control system uses the back-electromotive forces generated in the motor coils in order to provide information indicating the position of the motor.

2. Discussion of the Related Art

Most of the sensor-free control systems are used with three-phase motors that are bipolar motors, that is, whose coils conduct currents in both directions.

The European application 0,433,219 describes a control system for detecting back-electromotive forces, applied to a stepping bipolar motor to provide a self-switching of the motor. Stepping motors are two-phased. Generally, self-switching of a motor consists in providing a new rotation order (to impose a new step) to the motor as soon as the preceding order (the step) has been implemented.

A drawback of the use of a bipolar motor, as is apparent in European application 0,433,219, is that such a motor requires two current inverters (or four switches) per coil, which renders the control circuit complex and expensive (8 switches are required in application 0,433,219).

Another drawback of the control system according to European application 0,433,219 is that the connection of the motor's coils is specially designed and requires the use of a motor with eight supply wires. 8-wire motors are not frequently used and are therefore seldom available as standard elements.

A further drawback of the system according to European application 0,433,219 is that, during the recovery phases during which the currents in the coils are reversed (at each step switching), the voltages measured by the system are difficult to use and can cause unforeseeable reactions of the system.

The control of a one-pole synchronous motor (i.e., a motor whose coils conduct currents in one direction only) requires one switch per coil. There exist sensor-free control systems for one-pole motors, but they are based, like the three-phase motors, on a discontinuous power supply of the coils and therefore do not allow to take full advantage of the performances (torque, efficiency) of the motor.

SUMMARY OF THE INVENTION

An object of the invention is to provide for connecting the coils of a one-pole synchronous motor including a magnetized rotor operable to provide information about the back-electromotive forces, while using a conventional standard one-pole motor.

This object is achieved with a synchronous motor, including a magnetized rotor and a stator provided with two pairs of coils having a substantially equal impedance. The motor includes a floating common node to which are connected first terminals of the coils. The second terminal of each first coil of a coil pair is connected to a first supply terminal through a first respective switch. The second terminal of each second coil of a coil pair is connected to a second supply terminal through a second respective switch.

An object of the invention is also to provide a particularly simple system for controlling, in self-switching mode, or in stepping mode, a synchronous motor connected as above described.

Another object of the invention is to provide such a system capable of suitably operating during recovery phases.

Still another object of the invention is to provide, in such a system applied to a one-pole stepping motor, means for detecting the effective realization of the steps imposed to the motor.

A further object of the invention is to provide such a system operable for detecting a short or a failure of the coil or a switch, or an accidental connection of one terminal of the coil to a supply terminal.

Those objects are achieved with a system for controlling a motor of the above-mentioned type, including: a control circuit operable for controlling switches so as to carry out a sequence of combinations of simultaneous switching-on operations of a first respective switch and of a second respective switch, the transition from one switching-on combination to another combination being provided in order to cause the rotation of the rotor according to a predetermined angle; and at least one detection circuit using the voltage occurring at the floating common node so as to detect at least one operation condition of the motor.

According to an embodiment of the invention, the detection circuit is provided for detecting the fact that the mean voltage of the medium node approaches either one of the voltages present across the supply terminals.

According to an embodiment of the invention, the detection circuit is provided for comparing, within a predetermined time interval between two step switching phases, the polarity of the alternating component of the medium node voltage with a polarity defined by the parity of the step switching.

According to an embodiment of the invention, the detection circuit is connected to the control circuit so as to switch a step whenever the voltage at the floating medium node crosses a predetermined value.

According to an embodiment of the invention, the detection circuit includes a window comparator.

According to an embodiment of the invention, the first coils and second coils, respectively, are magnetically coupled.

According to an embodiment of the invention, each switch is provided with a recovery diode, and the control circuit includes means for detecting the voltage inversion across a switch and for turning-off at least the adjacent switch.

According to an embodiment of the invention, the junction between a switch and a coil is connected to the control terminal of the adjacent switch through a diode connected in the blocking direction under normal operation conditions.

The foregoing and other objects, features, aspects and advantages of the invention will become apparent from the following detailed description of the present invention when taken in conjunction with the accompanying drawings.

Before describing the invention, a one-pole synchronous motor with a conventional magnetized rotor, as well as a conventional connection of the motor's coils, will be described.

Conventional one-pole synchronous motor

Figure 1:
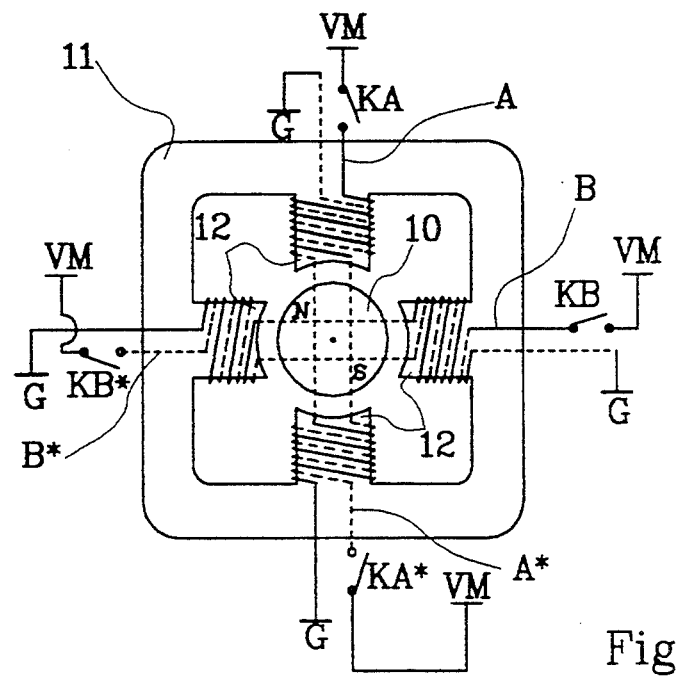
FIG. 1 schematically shows the structure and connection of the coils of a one-pole synchronous motor having a conventional magnetized rotor.

FIG. 1 schematically shows the structure of a one-pole synchronous motor including a magnetized rotor. The motor includes a magnetized rotor 10 having a north face N and a south face S. A magnetic yoke or stator 1 surrounds rotor 10 and includes so-called "teeth" or "studs" 12, disposed in quadrature, and extending toward the rotor. Two coils, A (drawn in solid lines) and A* (drawn in dashed lines), are wound in the same direction about two opposite teeth 2. Hence, coils A and A* are highly mutually magnetically coupled. Two additional coils, B (drawn in solid lines) and B* (drawn in dashed lines), are similarly wound about the two remaining opposite teeth.

At the vicinity of each tooth, two wires are disposed so that each wire is connected to one of the two coils wound about the tooth. A first wire is connected to a fixed voltage, such as ground G; the second wire is connected to a supply voltage VM through a respective switch Ka, Kb, KA* and KB*. Thus, the coils are star-connected to ground.

Conventionally, such a motor includes six supply wires. Four wires correspond to the wires that are connected to switches. The fifth and sixth wires are respectively connected to the terminals connected to ground of coils A and A*, and to the terminals connected to ground of coils B and B*.

Hereinafter, the same reference designates a control signal of a switch K and the associated coil.

Figure 2:
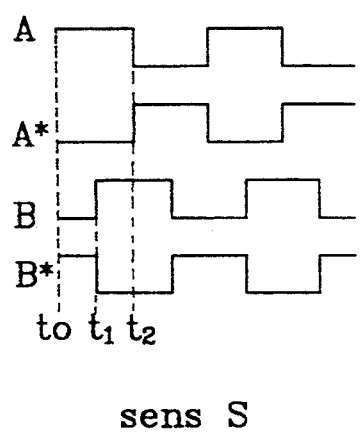
FIG. 2 illustrates the waveform of the conventional coil control signals in order to rotate the motor in either direction.
Figure 2:
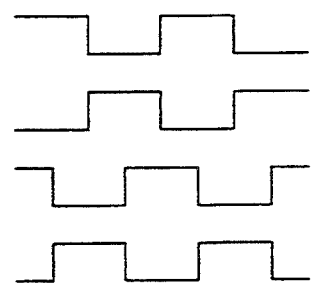

FIG. 2 shows the waveforms of the control signals A, B, A*, B*, respectively, for a rotation direction S of the rotor and an opposite rotation direction −S.

Signals A, A*, and B, B* are in phase opposition, respectively. For rotation in direction S, signal A is, for example, in phase delay by 90° with respect to signal B; for rotation in direction −S, signal A is in phase advance by 90°. Such control signals are the most frequently used because it is preferable to always feed two coils simultaneously. Then, schematically, the motor operates as follows.

At a time $t_0$, coils A and B* are fed. Rotor 10 goes, for example, to the position shown in FIG. 1. At a time $t_1$, the rotation is switched and coils A and B are fed. Then, rotor 10 rotates 90° in direction S. At a time $t_2$, a new rotation is switched and coils A* and B are fed; rotor 10 rotates again 90° in direction S, and so forth.

A one-pole stepping motor is a synchronous motor having the same four-coil structure as the motor of FIG. 1, except that it includes a rotor with a large number of N and S pole pairs. When the rotation of the stepping motor is controlled, the motor rotates by one step instead of rotating 90°. Given this similarity between stepping motors and synchronous motors, stepping motors only will be described, but the whole description also applies to synchronous motors.

One-pole motor according to the invention

Figure 3:
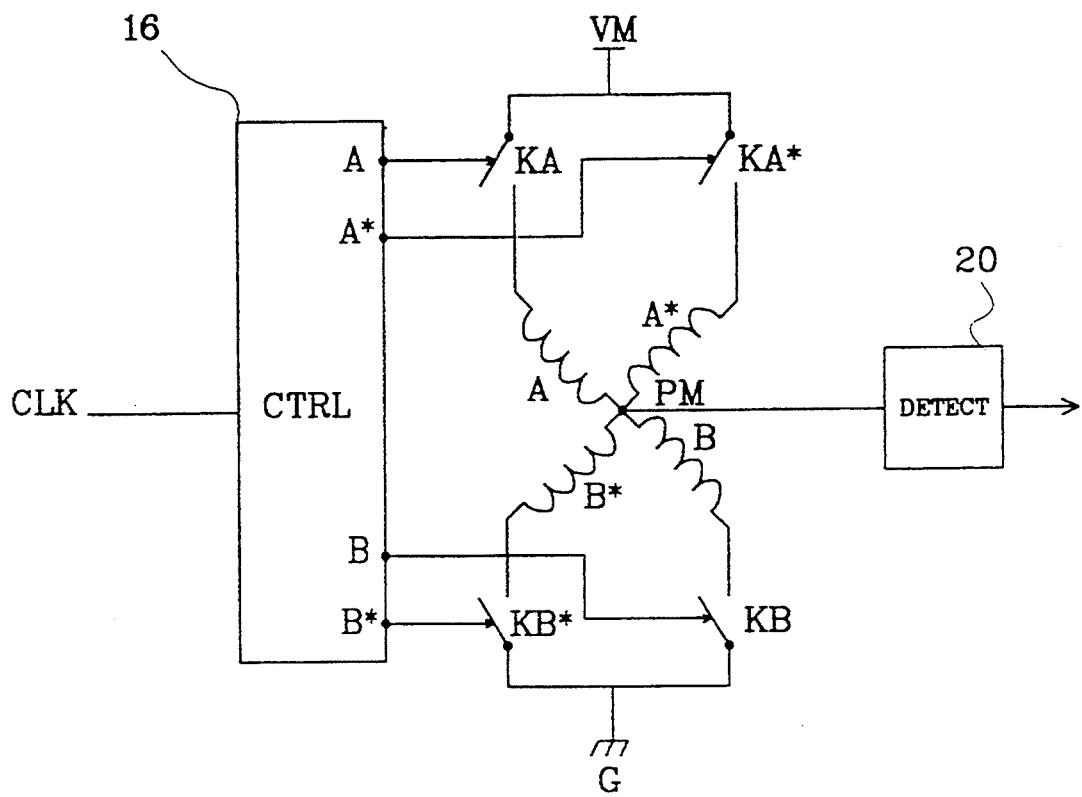
FIG. 3 schematically shows a connection according to the invention of the coils of a one-pole synchronous motor.

FIG. 3 schematically shows a connection according to the invention of the coils of a one-pole stepping or synchronous motor. FIG. 3 shows the same elements as in FIG. 1, designated with the same references. Coils A, B, A*, and B* are cross-connected to a floating medium node PM (i.e., no longer to a fixed voltage, such as in the circuit of FIG. 1).

Switches KB and KB* controlling coils B and B* are connected to a fixed voltage, such as ground G; switches KA and KA* controlling coils A and A* are connected to a supply voltage VM.

An advantage of this connection is that it requires coils withstanding half the supply voltage VM only, whereas they should withstand the whole supply voltage VM in the connection of FIG. 1. As a result, the coils include fewer turns and are therefore less expensive.

Another advantage of this connection is that the supply terminals are not fully shorted, even if one of coils A and A* or B and B* is accidentally shorted.

It should be noted that the connection wires used according to this configuration are the same as those used for the conventional configuration of FIG. 1 (six-wire motor). Thus, it is unnecessary, in order to control a motor according to the invention, to provide additional connection wires in a conventional motor designed to be connected as in FIG. 1. Additionally, if it is not desired to use the voltage at the medium node PM, four wires only are necessary to feed the motor.

Another advantage of the connection according to the invention is that there appears at the medium node PM a voltage whose variations are representative of the back-electromotive forces occurring in the coils. This voltage can be used in various ways, as will be seen later on, by a detection circuit to provide a diagnostic and/or control function.

A further advantage is that, at the occurrence of a failure, such as a shorting or breakdown of a coil or a switch, or an accidental connection of a coil terminal to a supply terminal, the voltage at the medium node PM is significantly unbalanced and can be used to indicate this failure.

Control signals A, B, A*, and B* to be provided to switches K are identical to the conventional signals of FIG. 2. Those signals are provided by a control circuit 16 (CTRL) receiving a clock signal CLK that determines the switching frequency of the motor's steps.

Figure 4:
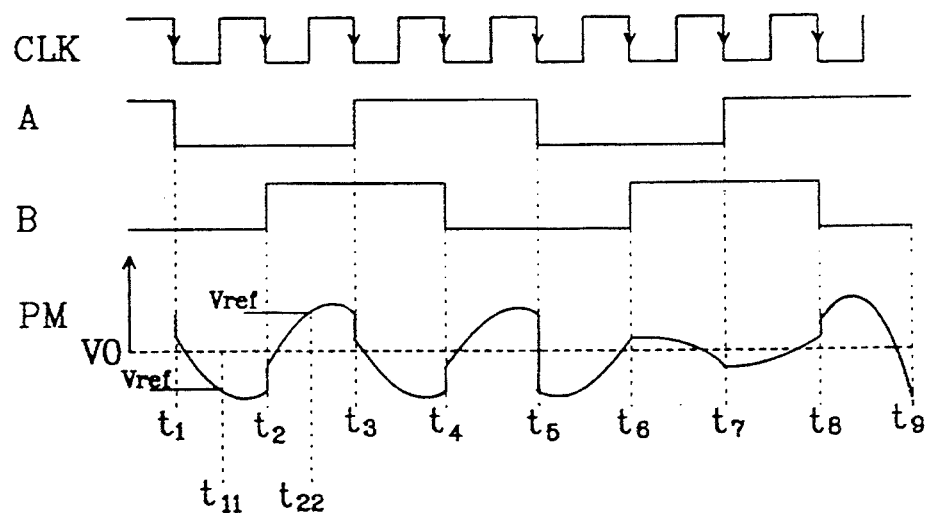
FIG. 4 shows the waveforms of coil control signals and of the voltage at a node of the circuit of FIG. 3.

FIG. 4 shows the waveforms of the control signals A and B (signals A* and B* being respectively the reverse signals of signals A and B) and of the clock signal CLK operable to switch several steps. FIG. 4 also shows the corresponding waveform of the voltage occurring at floating medium node PM.

At times $t_1$–$t_9$, successive steps of the motor are switched during the falling edges of signal CLK. Voltage PM oscillates about a mean value $V0=VM/2$ if the characteristics of the motor's coils are identical. It is noticed that the waveform of voltage PM, between two switch times, is very similar to a fraction of a sine-wave half-period; this half-period fraction changes its polarity with respect to value V0 from one step to the next one. Hereinafter, voltage PM—V0, that represents the alternating component of voltage PM, will preferably be referred to.

Detection of missed steps in a stepping-type motor

From time $t_5$, an abnormal event occurs that can be detected through voltage PM (or PM—V0). At time $t_5$, the resistive torque becomes high enough to prevent the motor from rotating by the step imposed by the control signals. The half-period fraction between times $t_5$ and $t_6$ withstands a phase shift also occurring within intervals $t_6$–$t_7$, $t_7$–$t_8$ and $t_8$–$t_9$ with, additionally, random variations of amplitude.

Under normal operation conditions, (between times $t_1$ and $t_5$), voltage PM—V0 is negative at the end of each odd half-period fraction, for example, ($t_1$–$t_2$, $t_3$–$t_4$) and positive at the end of each even half-period fraction ($t_2$–$t_3$, $t_4$–$t_5$). From time $t_5$, the polarity of voltage PM—V0 is reversed with respect to the previous conditions, that is, voltage PM—V0 becomes positive at the end of each odd half-period fraction and negative at the end of each even half-period fraction.

Thus, by detecting the polarity of voltage PM-V0 at the end (or at the beginning) of a half-period fraction having a given parity, an imposed step that has just been missed is indicated.

A missed step indication can simply be used in order to signal an error and, for example, to stop the motor. However, this indication can be used to provide the motor's position that is obtained by subtracting the number of missed steps from the number of imposed steps.

Figure 5:
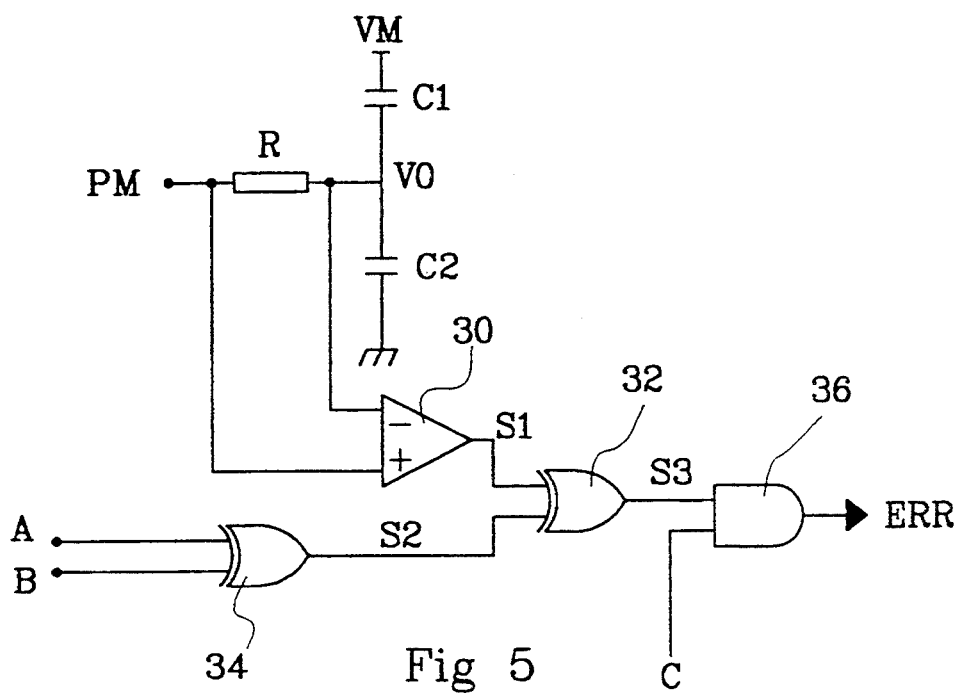
FIG. 5 is an exemplary circuit according to the invention, operable for detecting missing steps.

FIG. 5 shows an embodiment of the detection circuit 20 providing an error signal ERR exhibiting one pulse for each missed step. Circuit 20 uses voltage PM as well as the control signals A and B of switches KA and KB, and a signal C for clocking the step switching.

Voltage PM is applied to a terminal of a resistor R whose second terminal is connected to the junction between two capacitors C1 and C2 that are serially connected between voltage VM and ground. The polarity of the alternating component of signal PM thus occurring across resistor R is detected by a comparator 30. The output signal S1 of comparator 30 is applied to an input of an exclusive OR gate 32. A second input of an exclusive OR gate 32 receives the output signal S2 of an exclusive OR gate 34 that receives, at two respective inputs, signals A and B. The output signal S3 of gate 32 is provided to the input of an AND gate 36 whose second input receives the clock signal C.

The clock signal C appears in the form of positive pulses having a width smaller than the half-period of signal C. The falling edges (marked by arrows) of signal C are coincident with the step switching phases. Such a signal C can be obtained from a rectangular clock signal (CLK) through a monostable flip-flop and, at the most, two inverters.

Figure 6:
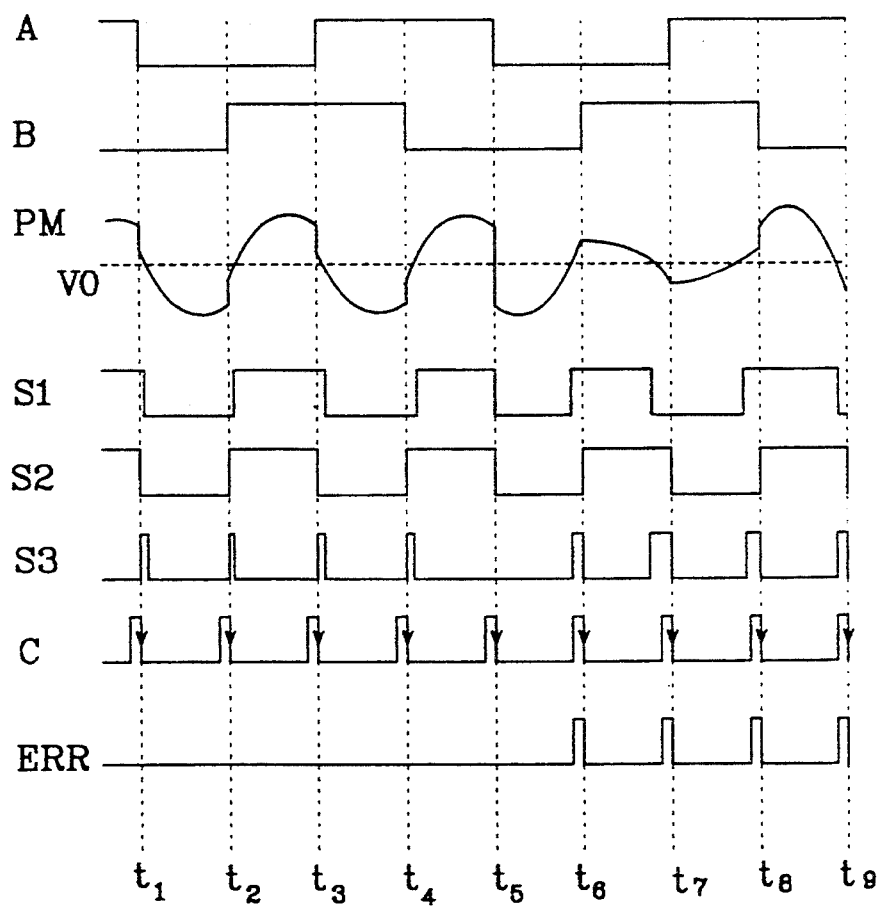
FIG. 6 illustrates waveforms of signals occurring at various nodes of the circuit of FIG. 5.

FIG. 6 shows waveforms of signals S1, S2, S3, C and ERR in the situation of FIG. 4. The signals of FIG. 4 are shown again in FIG. 6.

With the configuration of FIG. 5, signal S1 is at 1 when voltage PM exceeds value V0, and at 0 otherwise. Signal S2 oscillates between 0 and 1 at each step switching. Signal S3 is at 1 each time signals S1 and S2 have different values. This occurs when the half-period fractions are above value V0 during odd steps and below value V0 during even steps, that is, immediately after each time $t_1$–$t_4$ and immediately before each time $t_6$–$t_9$. Thus, at times $t_1$–$t_5$, pulses S3 and C do not overlap and the output ERR of AND gate 36 remains at 0. However, at times $t_6$–$t_9$, pulses S3 and C overlap and signal ERR then simultaneously provides pulses, each indicating that one step has been missed.

If the motor has two rotation directions determined by a direction signal, an additional exclusive OR gate is provided in the circuit of FIG. 5 between gates 32 and 34, one input of the OR gate receives the direction signal.

Self-switching of a stepping or synchronous motor

Figure 7:
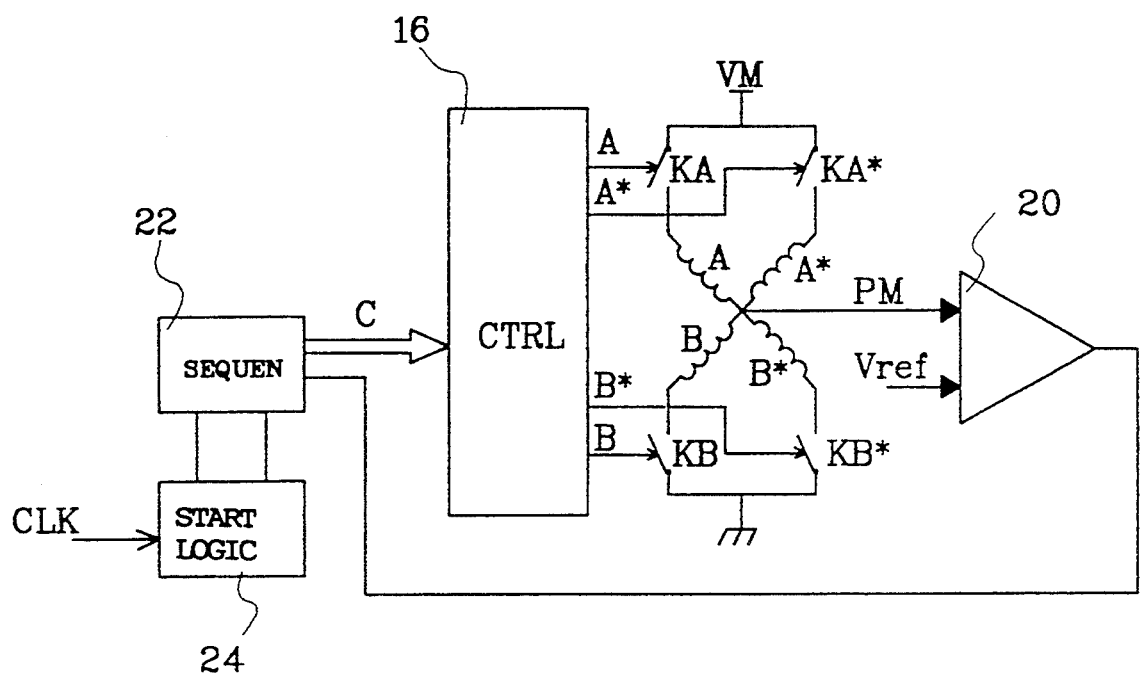
FIG. 7 shows a self-switching system for a motor according to the invention.

FIG. 7 schematically shows an embodiment of a self-switching system for a motor connected according to the invention. The same elements as those of FIG. 3 are shown and are designated with the same reference numerals. The detection circuit 20 is in the present case a comparator (that can be a window comparator) comparing voltage PM—V0 of the floating medium node with a reference voltage Vref, that can be zero. The output signal of comparator 20 is used by a sequencer 22 that provides a step clock signal C, instead of the clock signal CLK, to the control circuit 16 of switches K.

First, it is assumed that the motor rotates at a steady state. With reference to FIG. 4, at a time $t_1$, a step switching of the motor is caused (during a first pulse C). At a time $t_{11}$, comparator 20 detects whether voltage PM—V0 reaches voltage Vref. Sequencer 22 then waits for an adequate time interval ($t_{11}$-$t_2$, that can be equal to zero) before providing a pulse C for switching the next step at time $t_2$. At a time $t_{22}$, voltage PM—V0 reaches again value Vref, and so forth.

If, according to an embodiment of the invention, voltage Vref is equal to zero, comparator 20 detects the zero-crossings of voltage PM—V0. In that case, the possible transient phenomena occurring immediately after the step switching should be ignored, for example with a low-pass filter connected between the medium node PM and comparator 20, or by detecting the comparator output signal with a determined delay.

When the motor rotates at a speed lower than the steady state speed, for example, at the starting-up, the back-electromotive force is too low to be used. Therefore, a start-up logic 24, controlled by the clock signal CLK, is provided for causing, through sequencer 22, the motor to operate in stepping mode as long as the motor does not rotate fast enough. Signal CLK can be a signal having an increasing frequency (i.e., an acceleration ramp) generated in the start-up logic 24.

Alternative embodiments of the invention

Another window comparator allows to easily detect whether voltage PM approaches voltage VM (for example 2:3 of VM) or zero (1:3 of VM) in order to indicate whether a coil is shorted or broken, a switch remains durably turned off or on, or an accidental connection has occurred between, for example, one of the supply terminals and one of the motor's wires.

Figure 8A:
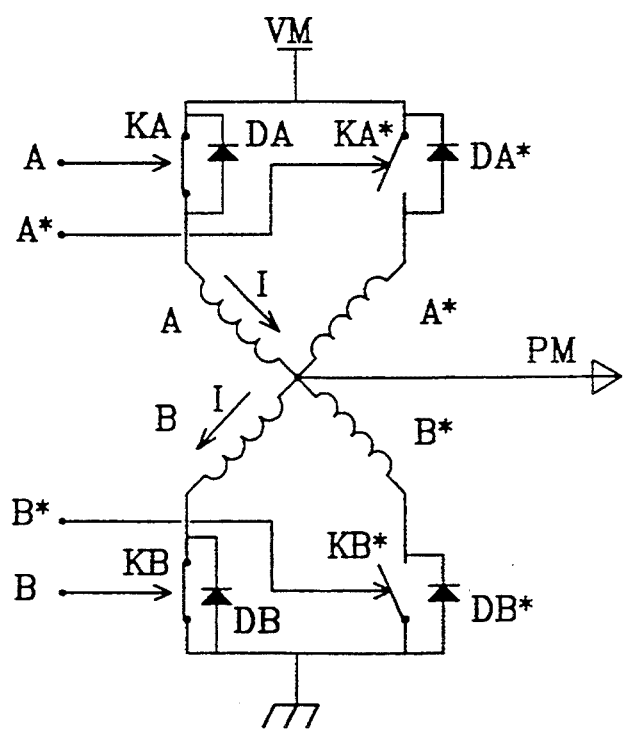
FIGS. 8A and 8B illustrate currents in the motor coil during the switching transition from one step to the next one.
Figure 8B:
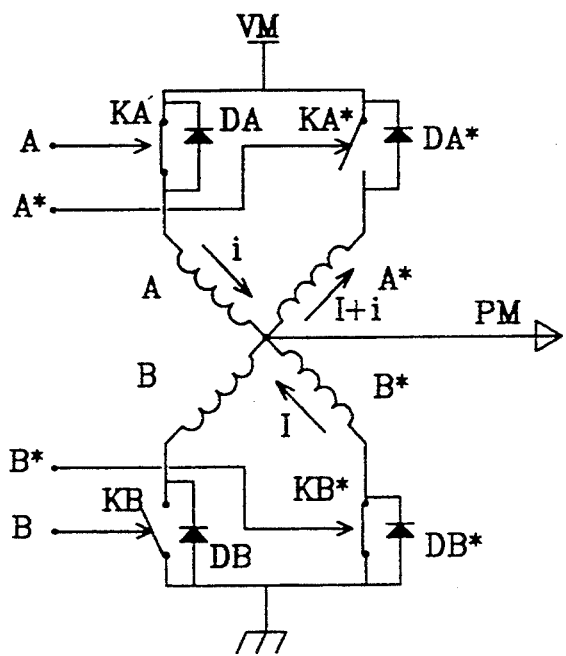

Hitherto, it has been assumed that the coils of the stepping motor had no energy stored from one step to the next one. FIGS. 8A and 8B show what really happens during the switching of one step to the next one. In these FIGS., with each switch KA, KB, KA* and KB* is associated a recovery diode DA, DB, DA*, DB* that is parallel connected with the switch in the blocking direction.

FIG. 8A shows the stake of the switches when a first step is switched. Switches KA and KB, for example, are on, and switches KA* and KB* are off. A current I is generated in coils A and B through switches KA and KB.

FIG. 8B shows the state of the switches when the next step is switched. Switch KA remains on, switch KB has been turned off and switch KB* has been turned on. Immediately after the switching phase, current I accumulated in coil B can no longer flow through switch KB and flows again in the reverse direction through coil B* due to the magnetic coupling between coils B and B*. Similarly, current I accumulated in coil A flows again in the reverse direction in coil A* due to the coupling between coils A and A*. Therefore, a current I flows through ground, switch KB* or diode DB* coils B* and A* and diode DA*. Current I starts decreasing more or less rapidly depending on the value of voltage VM and the various voltage drops across the diodes and the switches.

Simultaneously, switch KA being still on, a current appears and starts flowing through coils A and A*.

Thus, during a recovery phase occurring immediately after a switch phase of the switches, the cross arrangement (like the above-mentioned arrangement according to European application 0,433,219) no longer operates in a balanced condition, and the voltage at the medium node PM is so variable that it cannot be easily used.

An aspect of the invention is to avoid the unusable voltage variation at the medium node PM during recovery phases. The solution consists, for example in the case of FIG. 8B, in turning off at least switch KA as long as the voltage across switch KA* is negative.

Indeed, during the recovery phase shown in FIG. 8B, a current starts flowing through diode DA* that is connected in the normally blocking direction. Hence, the voltage across diode DA* (and its associated switch KA*) is reversed.

Figure 9:
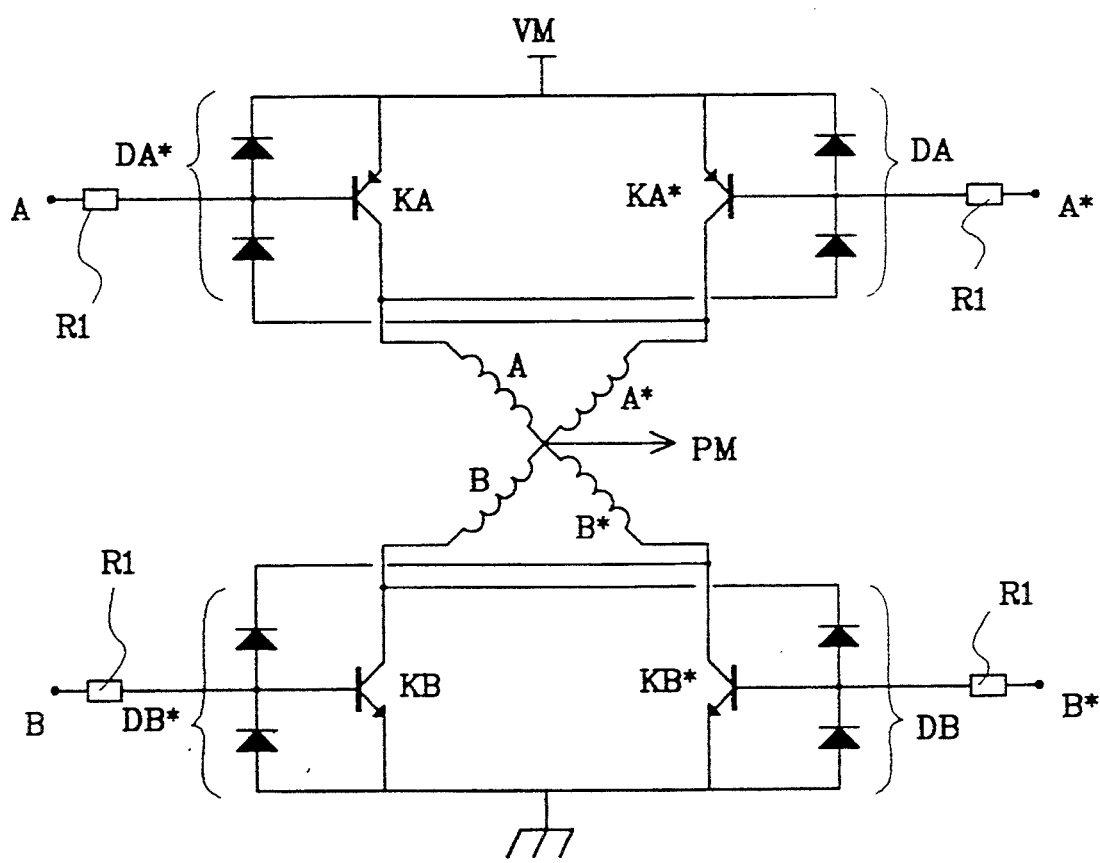
FIG. 9 shows an embodiment of a device useful for avoiding a drawback associated with the flow of recovery currents through the motor's coils.

FIG. 9 shows an exemplary embodiment of a circuit operable for turning off an adequate switch during the flow of recovery currents. Switches KA and KA* are PNP transistors having an emitter connected to the supply voltage VM. Switches KB and KB* are NPN transistors having an emitter connected to ground. Each recovery diode D is in fact formed by a pair of diodes disposed in series in the same conduction direction. The junction tion between the diodes of one pair (for example, DA*) associated with a first transistor (KA*) is connected to the base of the adjacent transistor (KA), that is, of the second transistor connected to the same supply voltage (VM) as the first transistor.

Thus, in the example of FIG. 8B, the recovery current I+i flows through the pair of diodes DA*. The threshold voltage occurring across the diode disposed in parallel with the base-emitter junction of transistor KA, biases the junction in reverse direction, thus causing blocking of transistor KA.

Resistors R1 are disposed in series between the bases of transistors K and the control terminals A, B, A* and B* of the transistors so that the transistors can be blocked despite the presence of the control signals.

An alternative embodiment of the circuit of FIG. 9 provides, as in FIGS. 8A and 8B, for each transistor a single recovery diode, the collector of a transistor being connected to the base of the adjacent transistor through a second diode, that is connected in the blocking direction outside the recovery phases. Thus, during a recovery phase, if the recovery diode of a transistor becomes conductive, the base-emitter voltage of the adjacent transistor becomes substantially equal to zero and blocks the transistor. Such variant especially applies to MOS transistors that intrinsically have a "recovery" diode disposed between the drain and source.

A further variant of the circuit of FIG. 9 lies in the provision of comparators across two adjacent switches, that cause the blocking of all the transistors when the voltage across a switch is reversed.

As is apparent to those skilled in the art, various modifications can be made to the above disclosed preferred embodiments, more particularly for the fabrication of the detection circuit 20 and the logic circuit form controlling the switching off of the switches during the recovery phases.

We claim:

1. A system for controlling a one-pole synchronous motor, with a magnetized rotor and a stator provided with two pairs of coils, comprising:
   — a floating common node to which are connected first terminals of said coils, the second terminal of each first coil of a coil pair being connected to a first supply terminal through a first respective switch, and the second terminal of each second coil of a coil pair being connected to a second supply terminal through a second respective switch;
   — a control circuit for controlling the switches according to successive switching cycles, so that the rotor rotates through a predetermined angle at each switching cycle; and
   — at least one detection circuit using the voltage occurring at the floating common node so as to detect at least one operation condition of the motor.

2. The system of claim 1, wherein said detection circuit detects the fact that the mean voltage at the floating common node approaches either one of the voltages present across said supply terminals.

3. The system of claim 1, wherein said detection circuit compares, within a predetermined time interval between two switching cycles, the polarity of the difference between the voltage at the floating common node and the average value thereof with a polarity defined by the parity of the switching cycle.

4. The system of claim 1, wherein said detection circuit is connected to said control circuit for carrying out the switching cycle whenever the voltage at said floating common node crosses a predetermined value.

5. The system of claim 1, wherein said detection circuit includes a window comparator.

6. The system of claim 1, wherein the first and second coils are mutually magnetically coupled.

7. The system of claim 6, wherein each switch is provided with a recovery diode, and wherein said control circuit includes means for detecting the polarity inversion across one switch and then turning off at least another switch connected to the same voltage as said one switch.

8. The system of claim 7, wherein the node between said one switch and the corresponding coil is connected to a control terminal of said other switch through a diode connected in the blocking direction under normal operation conditions.

* * * * *